United States Patent

Boettcher et al.

[11] 3,873,504
[45] Mar. 25, 1975

[54] FLAME-RETARDANT COPOLYESTER RESIN CONTAINING DIALKYL TETRABROMO DIPHENOXYALKANE DICARBOXYLATES

[75] Inventors: Richard R. Boettcher; William N. Knopka, both of Wilmington, Del.

[73] Assignee: FMC Corporation, Philadelphia, Pa.

[22] Filed: Oct. 3, 1973

[21] Appl. No.: 402,896

[52] U.S. Cl.. 260/47 C, 117/138.8 A, 117/138.8 N, 161/169, 260/33.4 P, 260/40 R, 260/40 P, 260/49, 260/DIG. 24
[51] Int. Cl............................................ C08g 17/04
[58] Field of Search.................... 260/47 C, DIG. 24

[56] References Cited
UNITED STATES PATENTS

| | | | |
|---|---|---|---|
| 2,465,150 | 3/1949 | Dickson | 260/75 |
| 3,547,883 | 12/1970 | Kobayashi et al. | 260/47 |
| 3,700,540 | 10/1972 | Buteux | 161/165 |
| 3,705,130 | 12/1972 | Komatsu et al. | 260/47 |

Primary Examiner—Lester L. Lee

[57] ABSTRACT

Flame-retardant copolyester resin of from at least 3 up to 15 mol percent of random ester units having the following general formula:

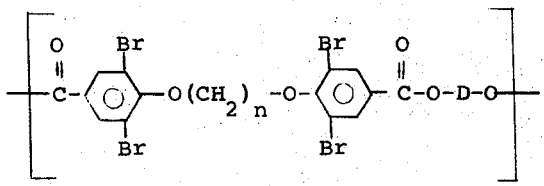

wherein n is 2, 4 or 6 and D is the residue of a saturated diol, and from 97 to 85 mol percent of at least one different ester unit of a saturated aromatic dicarboxylic acid and a saturated diol.

6 Claims, No Drawings

FLAME-RETARDANT COPOLYESTER RESIN CONTAINING DIALKYL TETRABROMO DIPHENOXYALKANE DICARBOXYLATES

It is known that polyester resins have a high carbon content and are quite flammable. They can be rendered flame-retardant by incorporating inorganic and organic materials therein, especially those containing bromine, chlorine, phosphorous, antimony, zinc and alumina. The main drawback of these systems is the adverse effects they have on fibers produced therefrom, since appreciable quantities of flame-retardant agents are required to promote the required level for flame-retardance. As a result, these materials can render the fiber brittle or, in other ways, affect the usually outstanding physical properties of the polyester. Another disadvantage to the additive approach is the fact that such additives can be easily leached out or removed during normal laundering and dry cleaning, causing an adverse effect on the flame-retardancy of the fabric.

An alternate method to improve the flame-retardancy of a polyester resin is the incorporation of a comonomer which contains one or more of the elements that are known to impart flame-retardancy. The major disadvantage of this approach is that the molar concentration of the comonomer, which is required to achieve the desired level of flame-retardance, is generally so high that the resultant resin manifests physical properties not usually associated with polyester. For example, a large proportion of comonomer would lower the melting point and, as a result, limit the utility of the polyester. Likewise, certain comonomers lower the crystallinity of the polymer, producing amorphous polymers which are incapable of producing commercially suitable textile fibers. If a flame-retardant copolyester could be produced with good physical and thermal properties, it would receive widespread acceptance for the manufacture of shaped articles.

The need for a polyester fiber which has good physical properties and high flame-retardancy is most critical for yarn and fabric blends of polyester fibers and cellulosic fibers. Polyester fibers are thermoplastic and when exposed to a flame, burn and melt away from the flame, thus extinguishing themselves. If polyester fibers are blended with flammable cellulosic fibers and exposed to a flame, the polyester is more likely to continue burning even when melting since the burning cellulose fiber continuously ignites it. If polyester fibers are blended with flame-retardant cellulosic fibers and the blend ignited, the flame-retardant cellulosic fibers burn only in the area of flame contact. However, the flame-retardant cellulosic fiber acts as a scaffold or support and prevents the polyester fiber drom dripping or shrinking away from the flame, and the polyester continues to burn.

It is known in the art to produce fiber-forming, nuclearly polychlorinated polymers of aromatic dicarboxylic acids and diols. Specifically, U.S. Pat. No. 3,194,794 of July 13, 1965 to Caldwell et al. discloses that one can produce polycondensation products of an aromatic dicarboxylic acid such as terephthalic acid, another dicarboxylic acid such as one having the general formula

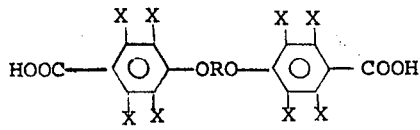

wherein X is hydrogen or chlorine and at least one X is chlorine, and R is alkylene; and a diol such as tetramethylene glycol or 1,4-cyclohexanedimethanol. The lowest molar percentage of a chlorinated diacid employed in a diacid mixture is shown in Example 5 of said patent wherein 50 mol percent of dichloroterephthalic acid is used along with 50 mol percent of terephthalic acid to prepare the copolyester resin. In addition, U.S. Pat. No. 3,705,130 of Dec. 5, 1972 to Komatsu et al. disclose a flame-retardant, filament-forming polyester of at least 75 mol percent of a repeating unit represented by the formula

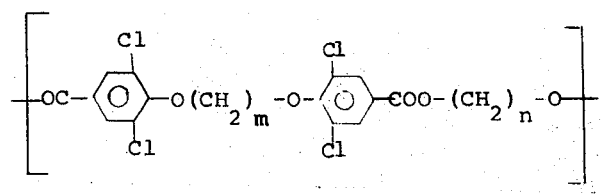

wherein $m$ is 2 or 4, $n$ is 4 or 6 and $n$ is larger than $m$.

It has now been found that excellent flame-retardant, shaped articles can be prepared from aromatic copolyesters having no greater than 15 mol percent of random ester unit having the general formula

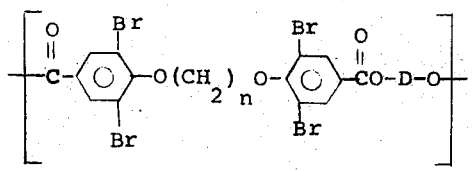

wherein D is the residue of a saturated diol and $n$ is 2, 4 or 6.

It is a primary object of this invention to provide a flame-retardant polyester resin capable of forming shaped articles.

It is another object of this invention to provide a flame-retardant polyester resin suitable for the formation of fibers which will meet more stringent flame-retardant test requirements while maintaining good fiber physical properties.

It is another object of this invention to provide a flame-retardant fiber blend of a flame-retardant polyester fiber and a flame-retardant cellulosic fiber which fiber blend has good physical properties.

It is still another object of this invention to provide fabrics having good permanent flame-retardancy and good physical properties which fabrics are prepared from polyester fibers and cellulosic fibers.

These and other objects are accomplished in accordance with this invention which comprises a filament-forming copolyester resin of from at least 3 up to 15 mol percent, preferably from 5 to 10 mol percent of random ester units having the following general formula

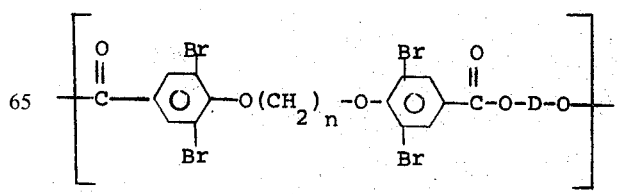

wherein $n$ is 2, 4 or 6 and D is the residue of a saturated diol, and from 97 to 85 mol percent of at least one different ester unit of a saturated organic dicarboxylic acid and a saturated diol, at least a major proportion of said dicarboxylic acid being aromatic.

The saturated diol from which D is a residue and which is used to form the different ester unit is preferably an aliphatic glycol which meets the formula HO—$(CH_2)_a$—OH wherein $a$ is an integer of from 2 to 10. In general, alkylene glycols having from 2 to 12 carbon atoms, e.g., gem dialkyl glycols, bis(hydroxymethyl) cyclohexane and diethylene glycol are useful saturated diols.

The aromatic dicarboxylic acid used to form the different ester unit is preferably either terephthalate acid or 2,6-naphthalene dicarboxylic acid. Other aromatic acids which can be used alone or in mixtures with the preferred diacids include isophthalic acid, bibenzoic acid, 2,7-naphthalene dicarboxylic acid, diphenyl sulfone dicarboxylic acid, sodium sulfoisophthalic acid, sodium sulfoalkoxyisophthalic acid and the like.

While at least a major proportion, and preferably at least 75 mol percent of the diacid used to form the different ester unit is aromatic, aliphatic dicarboxylic acids are also employed, if desired. The aliphatic acids include, for example, adipic, succinic, malonic, glutaric, and the like.

The copolyesters of this invention are prepared by conventional techniques for the preparation of filament-forming, thermoplastic, linear copolyester resins of the polycondensation type. The most common method for their preparation includes the transesterification-polycondensation method wherein a lower alkyl diester of the diacid and the saturated diol are reacted together via an ester interchange reaction, usually in the presence of a catalyst, and the product polycondensed to a high molecular weight, usually in the presence of a condensation catalyst. Another common method is the direct condensation method wherein the diacid and diol are directly condensed and this product polycondensed to high molecular weight. Using any method for the preparation of a prepolymer, the prepolymer or low molecular weight polymer of the major copolyester component may be reacted in a polycondensation reaction with either alpha, omega-bis-(2,6-dibromo-4-oxybenzoic acid) alkane, the lower alkyl diester thereof to form a high molecular weight (fiber-forming) polymer.

The copolyester resins of this invention are those having an intrinsic viscosity of at least about 0.25, and preferably at least about 0.4 as determined in a 60 weight percent phenol and 40 weight percent tetrachloroethane solution at 30°C.

The copolyester resin described herein can have various additives incorporated therein to improve the resin properties. For example, heat, oxidation and ultraviolet light stabilizers, antistatic agents, plasticizers, dyes, pigments and the like can be employed.

Additionally, a metal compound from the group consisting of antimony oxides, e.g., antimony trioxides; antimony salts of $\alpha$-hydroxycarboxylic or $\alpha$, $\beta$-dicarboxylic acid (see Ger. Off. 2121186 ), zinc oxide, alumina and mixtures thereof can be mixed into the copolyester resin to provide additional improvement in flame-retardant properties. The metal compound is present in an amount such that the metal is present in an amount of from about 0.5 to about 5 percent, based on the weight of the resin.

While the resin of this invention can be formed into various shaped articles including filaments, bands, sheets and molded articles, it is especially useful when formed into textile fibers and yarns. These fibers are used, for example, to prepare flame-retardant clothing, carpets and draperies.

Fibers or filaments are usually formed by melt extrusion of the resin composition through a multihole spinneret in a conventional manner. The as-spun yarn is then conventionally oriented to produce textile yarn or the continuous filament or staple fiber type.

The most important embodiment of this invention comprises a mixture of fibers of the flame-retardant copolyester resin described above and flame-retardant cellulosic fibers, especially those having permanent flame-retardant properties. Mixtures or blends of these flame-retardant copolyester fibers and flame-retardant cellulosic fibers provide textile fabrics having the highly desirable wear characteristics of polyester textiles with the highly desirable comfort characteristics of cellulosic material.

Flame-retardant cellulosic fibers preferably include cotton, rayon or cellulose acetate fibers which have been combined, impregnated or coated with flame-retardant chemicals which provide substantially permanent flame-retardant properties therefor without degrading the physical properties of the fiber. That is, the cellulosic fibers or fabrics produced therefrom should be capable of withstanding periodic detergent-water washing or cleaning with conventional dry cleaning solvents without losing much of their flame-retardant properties. Many flame-retardant treatments for cellulosic fibers are known and several have been found to produce substantially permanent flame-retardancy. It is preferred, in the case of artificially prepared cellulosic fibers such as rayon and cellulose acetate, that the flame-retardant chemical be incorporated into the cellulosic spinning solution thereby providing cellulosic fibers having the flame-retardant "locked in" the cellulosic matrix. Examples of the preparation of these types of cellulosic fibers are found in U.S. Pat. Nos. 2,816,004, 3,266,918, 3,321,330, 3,455,713, 3,556,825, 3,645,936 and 3,704,144.

One preferred form of this invention involves the use of the flame-retardant regenerated cellulose filaments or fibers described in U.S. Pat. No. 3,455,713. These fibers have been found to have excellent physical properties and permanent flame-retardancy. In brief, they are regenerated cellulose filaments having dispersed therein a substantially water-insoluble, liquid phosphonitrilate polymer having the general formula:

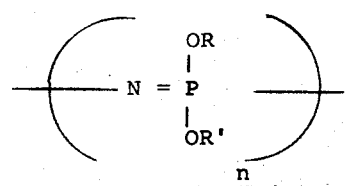

wherein R and R' are the same or different alkyl or alkenyl radicals having from one to six carbon atoms and $n$ is an integer of at least three.

These filaments are preferably prepared by incorporating a flame-retarding amount of the phosphonitrilate polymer in filament-forming viscose, and spinning and regenerating filaments.

In another aspect of the invention, the flame-retardant cellulosic fibers are cellulose acetate fibers prepared by incorporating flame-retardant amounts of compounds such as tris-(2,3-dibromopropyl) phosphate or similar compounds as disclosed in U.S. Pat. No. 3,321,330 into the acetate spinning dope and wet or dry spinning the fibers. Preferably, from about 2 to about 15 percent of the phosphate flame-retardant, based on the weight of the cellulose acetate, is used.

In general, fiber blends of this invention will contain from about 10 to 90, preferably 20 to 80 weight percent polyester fibers and 90 to 10, preferably 80 to 20 weight percent of cellulosic fibers.

The blended or combined flame-retardant polyester and cellulosic fibers are used in various fiber and fabric constructions including, for example, spun staple yarns, mixed or tangled continuous filament yarns, novelty yarns, knit, woven and nonwoven fabrics.

The flame-retardant polyester fibers described herein can also be blended with or combined in a fabric with normally flame-retardant fibers including, for example, glass fibers, polyvinyl chloride fibers, asbestos fibers, metal fibers, modacrylic fibers such as those having the trademark "Dynel" and "Verel", and aromatic ring polyamide fibers such as that having the trademark "Nomex". Fiber and fabric blends can, of course, comprise more than one of the other known flame-retardant fibers with the flame-retardant polyester fibers of this invention.

It is realized that blends of polyester fibers and cellulosic fibers have been treated, usually in the form of a fabric, with flame-retardant chemicals to provide flame-retardant material. However, this approach does not usually provide fabrics which will retain their flame-retardant properties after many washings or dry cleaning treatments. Furthermore, such after-treatments tend to stiffen the fabrics to an undesirable extent.

The following examples are set forth to demonstrate this invention.

EXAMPLE I

Preparation of Diethyl 2,2',6,6'-Tetrabromo Diphenoxyethane-4,4'Dicarboxylate

To a mixture of 400 ml. acetic acid and 83.09 g. (0.5 mole) ethyl 4-hydroxybenzoate was added dropwise over a 40 minute period 159.84 g. (1 mole) bromine in 100 ml. acetic acid. The dark reaction mixture was heated for 3 hours upon a steam bath and then cooled with an ice water bath. It was then poured over 500 ml. cold water. The white precipitate was filtered, washed thoroughly with water, and then dried in a vacuum oven to yield 144.31 g. (82.9 percent) ethyl-4-hydroxy-3,5-dibromobenzoate, melting point 180°–190°C. Reesterification of the material with 3 percent ethanolic hydrogen chloride yielded ethyl-4-hydroxy-3,5-dibromobenzoate which melted at 103°–105°C.

To 1500 ml. absolute ethanol was added 35.4 g. (1.54 g. atom) sodium metal. After all of the metal had reacted, 498.65 g. (1.54 mole) ethyl-4-hydroxy-3,5-dibromobenzoate was added. The hydroxyester went into solution almost immediately, but upon further stirring a solid precipitated. The resulting slurry was stirred for an additional 2 hours after which it was charged, along with 140.7 g. (0.75 mole) freshly distilled 1,2-dibromoethane, into a stirred autoclave. The autoclave was pressurized to 200 psi. with nitrogen and the reaction mixture was stirred and heated at 160°C. for 3 hours. The autoclave was then cooled and vented. Its contents were heated and filtered hot. The precipitate was slurried with water, heated and filtered hot. The precipitate, when dried, yielded 222.94 g. (44.1 percent) diethyl-2,2',6,6'-tetrabromo diphenoxyethane-4,4'-dicarboxylate, m.p. 177°–178°C. Recrystallization from glacial acetic acid raised the m.p. to 182°–183.5°C.

EXAMPLE II

Preparation of Terephthalate Copolyester (4.8 percent Bromine)

A 500 ml. reaction vessel equipped with a three-necked top, stirrer, thermometer, Claisen distilling head with condenser and receiver and furnished with heating means was successively charged with 194 g. (1.0 mole) dimethyl terephthalate, 22.8 g. (0.034 mole) of diethyl-2,2',6,6'-tetrabromo diphenoxyethane-4,4'-dicarboxylate, 134.6 g. (2.17 mole) of ethylene glycol and 0.1 g. of tetrabutyl titanate. The reaction mixture, while being agitated at atmospheric pressure under nitrogen, was heated to about 185°C. over a period of 65 minutes, then heated to 190°–195°C. for an additional 90 minutes, then 195°–205°C. for 30 minutes and finally at 205°–230°C. for 45 minutes. The prepolymer products were allowed to cool under an atmosphere of nitrogen.

120.0 g. of the prepolymer were polycondensed in a suitable reactor by applying heat along with reducing the pressure to 0.35 mm. Hg. over a period of approximately 90 minutes. After the pressure had been reduced to 1.0 mm., the reaction temperature was raised to about 275°C. and maintained at this temperature for about 130 minutes to form the desired copolymer. Strong fibers could be obtained from the molten resin. It had an intrinsic viscosity of 1.10; a free carboxyl content of 19 meq./kg. of polymer, a glass transition temperature of 76°C., a temperature of crystallization of 157°C. and a crystalline melting point of 238°C. An elemental analysis revealed the resin contained 4.82 percent bromine.

The above copolyester resin and those of the following Examples III–V were evaluated for flammability or flame-retardancy by grinding the resin sufficiently for the resulting particulate to pass through a 10 mesh screen and pressed into plaques 1/32 inch × 5 ½ inch × 5 ½ inch. The plaques were prepared as follows: A chrome plated brass plate is placed in a Carver Press; a sheet of 6 ½ inch × 6 ½ inch Teflon coated aluminum foil is placed on the brass plate, followed by a 6 inch × 6 inch × 1/32 inch spacer with inside dimensions of 5 ½ inch by 5 ½ inch. A 6 gram sample of the polymer to be evaluated is spread evenly inside the spacer. Next, a 5 ½ inch × 5 ½ inch square of fiberglass fabric is placed on the resin powder. Another 6 grams of resin is spread on the top surface of the fiberglass, followed by another sheet of Teflon coated foil and a second chrome plated brass plate. The press platens (previously heated at 270°C.) are slowly closed to the point where they just begin to touch the top chrome plate. After 3 minutes, the platens are tightly closed and pressure raised to 10,000–12,000 psig. After 1 minute, the pressure was released and the laminate quenched in a cold bath. The resultant plaques were cut into ½ inch × 5 ½ inch strips and evaluated in the Standard Method of Test for Flammability of Plastics Using the Oxygen Index Method, ASTM-D-2863-70, commonly called the Limiting Oxygen index (LOI) test. The higher the LOI number, the better the flame-retardant property of the resin.

The results of the LOI test on the various plaques of copolyester resins of Examples II–V are reported in Table I set forth hereinafter.

EXAMPLE III

Preparation of Terephthalate Copolyester (9.28 percent Bromine)

A melt polymerization reactor was charged with 137 g. of bis-(hydroxyethyl) terephthalate [poly(ethylene terephthalate) prepolymer previously prepared via the transesterification of dimethyl terephthalate and ethylene glycol] and 25.28 g. (0.0375 mole) of diethyl-2,2',6,6'-tetrabromo diphenoxyethane-4,4'-dicarboxylate. The reactor was heated from room temperature to 200°C. in 20 minutes under an atmosphere of nitrogen. Heating was continued for an additional 50 minutes, at which time the reaction temperature was 230°C. Heating was simultaneously increased while the vacuum was reduced to 0.6 mm. in 75 minutes. After heating at 245°C. for 60 minutes at 0.35 mm. Hg., the reaction mixture turned from a molten transparent mass to a white, opaque solid. Heating was continued for an additional 25 minutes until the reaction temperature was about 260°C. at which time the mass was once again molten. After heting at 258°–261°C. for 85 minutes at 0.5 mm. Hg., the heat was removed and the mass allowed to cool to room temperature.

Fibers were drawn from the molten mass. A laminated plaque was obtained when the resin was treated in the usual manner. The resin had the following properties: Intrinsic viscosity, 0.28; a free carboxyl content of 6.0 meq./kg.; percent bromine, 9.28; LOI plaque, 25.0; glass transition temperature, 74°C.; crystallization temperature, 135°C.; a crystalline melting point of 243°C.

EXAMPLE IV

Preparation of Terephthalate Copolyester (4.25 percent Bromine - 0.7 percent Antimony)

A 250 ml. reaction vessel equipped with a three-necked top, stirring and heating means, a thermometer and a Claisen distilling head fitted with a condenser and a receiver was successively charged with 97 g. of dimethyl terephthalate (0.5 mole), 11.4 g. (0.017 mole) of diethyl-2,2',6,6'-tetrabromo diphenoxyethane-4,4'-dicarboxylate, 67.5 g. (1.09 mole) of ethylene glycol and 0.1 g. of Ti(OBu)$_4$.

The reaction mixture, while being agitated at atmospheric pressure under a blanket of nitrogen, was heated to 180°C. in 30 minutes, whereupon the first drop of distillate was observed in the condenser. The reaction temperature was maintained at 180°C. for 80 minutes, then slowly raised to 230°C. over a period of 90 minutes. After about one hour at 230°C., heating was discontinued and the mixture allowed to cool under nitrogen.

100 g. of the prepolymer described above together with 3.8 g. of an antimony oxide-silica gel complex containing 25 percent $Sb_2O_3$ (commercially known as SB-25, offered by NL Industries) were charged into a polymerization reactor equipped with stirring and heating means.

The reaction mixture was heated to 280°C. over a period of about 90 minutes while simultaneously applying vacuum to 0.3 mm. Hg. Polymerization was allowed to continue for a period of about 90 additional minutes yielding a polymer with an intrinsic viscosity of 0.67; a free carboxyl content of 21 meq./kg., 4.25 percent bromine; 2.78 percent silicon; 0.74 percent antimony; a glass transition temperature of 75°C.; a crystallization temperature of 141°C.; a crystalline melting point of 238°C.; and an LOI of 25.3.

EXAMPLE V

Preparation of Terephthalate Copolyester (9.65 percent Bromine - 0.7 percent Antimony Dimethyl terephthalate 97.0 g., (0.5 mole), 26.8 g. (0.038 mole) of diethyl-2,2',6,6'-tetrabromo diphenoxyethane-4,4'-dicarboxylate, 70.0 g.(1.13 mole) of ethylene glycol and 0.124 g. of Ti(OBu)$_4$ were added to a reaction vessel similar to that described in Example IV. The mixture was heated to 180°–230°C. for about 170 minutes so that an ester interchange and distillation of the resultant methanol occurred providing a prepolymer.

A mixture of 100 g. of the above prepolymer together with 3.96 g. of an antimony oxide-silica gel complex (containing 25 percent $Sb_2O_3$) was polymerized at 282°–287°C. for 90 minutes under a pressure of 0.6–0.25 mm. Hg., then allowed to cool under a blanket of nitrogen. The resulting polymer had an intrinsic viscosity of 0.60; a free carboxyl content of 24 meq./kg, a glass transition temperature of 77°C., a crystallization temperature of 175°C. and a crystalline melting point of 223°C. Elemental analysis indicated the presence of 9.65 percent bromine, 2.09 percent silicon, and 0.71 percent antimony.

Fibers were easily obtainable from the molten resin; likewise a laminate was obtained; the LOI of this resin was 29.1.

The Limiting Oxygen Indexes (LOI) for the resins prepared in Examples II–V as well as the LOI for a resinous homopolymer of ethylene terephthalate (control) are set forth in the following table:

Table I

| Example | Composition | | | | FR |
|---|---|---|---|---|---|
| | Mole % Comonomer | Br (%) | Si (%) | Sb (%) | Rating (LOI) |
| Control | 0 | 0 | 0 | 0 | 20.5 |
| II | 3.2 | 4.82 | 0 | 0 | 24.1 |
| IV | 7.0 | 9.28 | 0 | 0 | 25.0 |
| V | 3.2 | 4.25 | 2.78 | 0.74 | 25.3 |
| VI | 7.0 | 9.65 | 2.09 | 0.71 | 29.1 |

EXAMPLE VI

Preparation of 2,6-Naphthalene Dicarboxylate Copolyester (5 percent Bromine)

Dimethyl-2,6-naphthalene dicarboxylate, 92.2 g. (0.375 mole), 10.8 g. (0.018 mole) of diethyl-2,2',6,6'-tetrabromo diphenoxyethane-4,4'-dicarboxylate, 51.2 g. (0.83 mole) of ethylene glycol and 0.0242 g. (0.04 mole percent - based on DMT) of Mn(OAc)₂ were fed successively into a glass reactor and heated to about 190°–200°C. Methanol and ethanol was distilled. The distillation was carried out to 80 percent completion, then the reaction temperature was raised to 230°C. and held there until no further distillate came over. The reaction mixture was allowed to cool providing 114 g. of prepolymer.

110 g. of the above prepolymer were combined with 0.044 g. of Sb₂O₃ in a polymerization reactor. The reactants were melted under an atmosphere of nitrogen at 200°–220°C., then polycondensed by applying heat and vacuum for about 60 minutes until a pressure of 0.4 mm. mercury had been attained. After the pressure had been reduced to 0.4 mm. Hg., the mixture was heated at 270°–275°C. for about 2 ½ hours, with the final pressure at 0.25 mm. The resulting polymer was drawn into fibers and pressed into a film; it had an intrinsic viscosity of 0.80; a free carboxyl content of 26 meq./kg.; and a glass transition temperature of 124°C. The Limiting Oxygen Index was 35.2. Analysis revealed 5.12 percent of bromine had been incorporated into the polymer.

The above prepared resin as well as those prepared in accordance with Examples VII–IX were tested for flame-retardancy in the same manner as the resins of Examples II–V and the Limiting Oxygen Indexes of these resins are set forth in Table II hereinafter.

EXAMPLE VII

Preparation of 2,6-Naphthalene Dicarboxylate Copolyester (10 percent Bromine)

Using the same technique as described in Example VI, 97.6 g. (0.4 mole) of dimethyl-2,6-naphthalene dicarboxylate, 26 g. (0.038 mole) of diethyl-2,2',6,6'-tetrabromo diphenoxyethane-4,4'-dicarboxylate, 57.1 g. (0.92 mole) of ethylene glycol and 0.0257 g. (0.04 mole percent of Mn(OAc)₂ were allowed to react at 200°–230°C. under an atmosphere of nitrogen, providing 132 g. of prepolymer.

120 grams of the above prepolymer were combined with 0.026 g. of Sb₂O₃ in a polymerization reactor. The reactants were melted and mixed under an atmosphere of nitrogen. Then the mixture temperature was raised from 200°C. to 275°C. over a period of about 60 minutes while the pressure was decreased to 0.4 mm. Hg. After heating at 275°C. for 2 hours at 0.3–0.4 mm. Hg, the mixture was quenched under a blanket of nitrogen giving 87 g. of polymer.

The polymer had an intrinsic viscosity of 0.36; a free carboxyl content of 12 meq./kg., and a glass transition temperature of 116°C. It was drawn into a fiber and pressed into a film. The LOI of the polymer was 39.0. Bromine analysis revealed 10.1 percent to be present.

EXAMPLE VIII

Preparation of 2,6-Naphthalene Dicarboxylate Copolyester (5 percent Bromine, 0.65 percent Antimony)

A laboratory reactor was charged successively with 122 g. (0.5 mole) of dimethyl-2,6-naphthalene dicarboxylate, 14.4 g. (0.024 mole) of diethyl-2,2',6,6'-tetrabromo diphenoxyethane-4,4'-dicarboxylate, 65 g. (1.1 mole) of ethylene glycol and 0.11 g. of Ti(OBu)₄. The mixture was heated to 180°–200°C. and methanol and ethanol distilled. After heating for 130 minutes, the temperature was raised to 200°–230°C. and held for 90 minutes, at which point the heat was removed giving 157.1 g. of prepolymer.

90 g. of the above prepolymer together with 3.02 g. of antimony trioxide-fused silica gel complex (NL Industries SB-25) were charged into a polymerization reactor. The reaction mixture was polymerized at 275°–280°C. for 165 minutes at 0.17–0.30 mm. The resulting polymer had an intrinsic viscosity of 0.53, a free carboxyl content of 26 meq./kg., a glass transition temperature of 116°C. and a crystalline melting point of 249°C.

Elemental analysis found: 5.0 percent, bromine; 0.65 percent, antimony; 1.04 percent, silicon.

Fibers were drawn from the molten resin. A molded fiber glass laminate was obtained; the LOI was 37.9.

EXAMPLE IX

Preparation of 2,6-Naphthalene Dicarboxylate Copolyester (9.4 percent Bromine, 0.7 percent Antimony)

In a procedure similar to that described in Example VIII, 122 g. (0.5 mole) of dimethyl-2,6-naphthalene dicarboxylate, 32.5 g. (0.048 mole) of diethyl-2,2',6,6'-tetrabromo diphenoxyethane-4,4'-dicarboxylate, 71.4 g. (1.15 mole) of ethylene glycol and 0.15 g. of Ti(OBu)₄ were combined in a reactor. After heating at 180°–200°C. for 90 minutes and at 200°–230°C. for about 70 minutes, the reaction mixture was allowed to cool to room temperature providing 183 g. of prepolymer.

125 g. of the above prepolymer was combined with 0.76 g. of Sb₂O₃ in a polymerization reactor. Polymerization was carried out at 275°–280°C. at about 0.2 mm. Hg. for 90 minutes. Fibers were drawn from the molten resin. Analysis of the resin indicated an intrinsic viscosity of 0.33; a free carboxyl content of 44 meq./kg.; a glass transition temperature of 114°C.; a crystalline melting point of 241°C.; a bromine content of 9.37 percent and an antimony content of 0.69 percent. An LOI determination of a fiber glass laminate of the resin was 43.3.

The Limiting Oxygen Indexes (LOI) for the resins prepared in Examples VI–IX as well as the LOI for a resinous homopolymer of ethylene-2,6-naphthalane dicarboxylate (control) are set forth in the following table:

Table II

| Example | Composition | | | | |
| --- | --- | --- | --- | --- | --- |
| | Mole % Comonomer | Br (%) | Si (%) | Sb (%) | LOI |
| Control | 0 | 0 | 0 | 0 | 28.3 |
| VI | 4.6 | 5.02 | 0 | 0 | 35.2 |
| VII | 8.8 | 10.1 | 0 | 0 | 39.0 |
| VIII | 4.6 | 5.00 | 1.04 | 0.65 | 37.9 |
| IX | 8.8 | 9.37 | 0 | 0.69 | 43.3 |

From the LOI test results shown in Tables I and II, it is evident that the copolyesters of this invention possess excellent flame-retardant properties.

To demonstrate the ability of these copolyesters to be prepared in the form of fibers and the outstanding properties of these fibers, the following examples are set forth.

EXAMPLE X

Fibers of Terephthalate Copolyester (4.35 percent Bromine)

A reaction vessel, equipped with a nitrogen inlet, heating means and stirring means, was charged with 194 grams (1.0 mole) of dimethyl terephthalate, 22.8 g. (0.034 mole) of diethyl 2,2',6,6'-tetrabromo diphenoxyethane-4,4'-dicarboxylate, 134.6 grams (2.17 moles) and 0.1 grams of tetrabutyl titanate (0.05 weight percent based on the weight of the terephthalate). The mixture was heated under a nitrogen atmosphere to 185°C. over 65 minutes, at which time the first drop of distillate was observed; after an additional 36.2 minutes, the reaction temperature had reached 190°C., at which time 50 percent of the theoretical alkanols had been collected. (Note: This was a mixture of ethanol and methanol.) Heating was continued at 190°–205°C. for 100 minutes, followed by a final period of 45 minutes at 205°–230°C. After cooling, the reaction equipment was dismantled, giving 271 g. of white prepolymer. This was used without further purification in the next step.

A reaction vessel was charged with 149 grams of the prepolymer described above. The mixture was stirred while raising the temperature to 275°C. over a period of 75 minutes. Concurrent with heating, the pressure was lowered to 0.6 mm. Hg. The above temperature and pressure were maintained for about 90 minutes, at which time the polycondensation was finished. The resultant resin was spun into a 10 filament yarn through a spinneret affixed to the bottom of the reactor, giving 66.4 g. of undrawn yarn. The resin had an intrinsic viscosity of 0.40, a free carboxyl content of 8 meq./kg.; a diethylene glycol content of 0.49 percent and a 4.35 percent bromine content, a glass transition temperature of 80°C., a crystallization temperature of 141.5°C., and a crystalline melting point of 245°C.

A yarn of the extruded filaments was drawn on a hot godet and over a platen at 225°F. at a draw ratio of 3.83. It had the following physical properties: tenacity, 4.22 g./d.; elongation at break, 42.3 percent; and an initial modulus of 88.6 g./d.

This copolyester yarn was combined in a conventional manner with a permanent flame-retardant rayon to provide a 50/50 blended yarn. The rayon was prepared in accordance with U.S. Pat. No. 3,455,713 and contained about 15 percent by weight of a water-insoluble, liquid polymer of di-n-propyl phosphonitrilate. The resulting yarn was knit into a sleeve on a Lawson knitting machine.

The knit fabric was evaluated in a vertical flammability tester as defined by the United States Department of Commerce FF 3-71 (37 FR 146,424) "Standard for the Flammability of Childrens' Sleepwear".

The fabric is considered flame-retardant if the average char length of five samples of the same fabric does not exceed seven inches, no individual sample has a char length of ten inches and no sample has a residual flame time (after flame) greater than ten seconds. The test results are shown in the following table:

Table III

| Sample No. | Vertical Flammability Test 3 Seconds Bone Dry After Flame | Char Length |
|---|---|---|
| 1 | 57 sec. AF | 8.13" |
| 2 | 74 sec. AF | 10.0 " |
| 3 | 69 sec. AF | 10.0 " |
| 4 | 37 sec. AF | 10.0 " |
| 5 | 33 sec. AF | 10.0 " |
| 6 | 32 sec. AF | 10.0 " |

These results show that the ethylene terephthalate copolyester resin fibers require more flame-retardancy than that supplied by the 5 percent bromine provided by the comonomer to permit knit fabrics constructed of blends of about 50 percent of said polyester fiber and flame-retardant rayon of this type to pass the stringent requirements of the Commerce Department flame test.

EXAMPLE XI

Fibers of Terephthalate Copolyester (10 percent Bromine)

In a manner similar to that described in Example X, 194 grams (1.0 mole) of dimethyl terephthalate, 53.6 grams (0.076 mole) of diethyl-2,2',6,6'-tetrabromo diphenoxyethane-4,4'-dicarboxylate, 140.1 g. (2.26 moles) of ethylene glycol and 0.1 gram of tetrabutyl titanate were combined and heated under a nitrogen atmosphere to 185°C. over 80 minutes at which time the first drop of distillate was observed. After an additional 35.6 minutes, the reaction temperature had reached 193°C., at which time 50 percent of the theoretical alkanols had been collected (mixture of ethyl and methyl alcohols). Heating was continued at 193°–200°C. for 90 minutes, followed by a final period of 40 minutes at 200°–224°C. At this point, heating was terminated to give 309.5 grams of white prepolymer. This was used without further purification in the next step.

150 g. of the above prepolymer was charged into a polymerization reaction vessel. The mixture was heated from 220°C. to 245°C. in 50 minutes while lowering the pressure to 10 mm. Hg. Heating was continued an additional 30 minutes until the temperature reached 275°C., where it was maintained for the duration of the reaction period. Concurrently, the pressure was lowered to 0.6 mm. Hg. over a 40 minute period. After 60 minutes at 275°C. at pressure between 0.6–0.1 mm. Hg., the polycondensation was finished, giving the copolyester resin. The resulting resin was spun into a 230 denier, 10 filament yarn through a spinneret affixed to the reactor bottom. 61.8 grams of white yarn were obtained. The yarn resin had an intrinsic viscosity of 0.59; a free carboxyl content of 18 meq./kg.; a diethylene glycol content of 0.81 percent; a bromine content of 10.0 percent; a glass transition temperature of 80°C.; a crystallization temperature of 178.5°C. and showed two melting peaks at 226° and 236°C.

The resultant yarn was drawn at a ratio of 4.13 over a godet and platen heated at 210°F. The following physical properties were reported: tenacity, 3.92 g./d.; breaking elongation, 36.3 percent; and initial modulus, 93.9 g./d. Heat-setting the drawn yarn at 360°F. for 3 minutes under tension produced a yarn with the following tensile properties: tenacity, 4.09 g./d.; breaking elongation, 34.3 percent; and initial modulus, 85.5 g./d.

The non-heat set copolyester yarn described above was combined in a conventional manner with the flame-retardant rayon described in Example X to provide a 50/50 blend. This was knit on a Lawson knitting machine into a sleeve. The fabric blend was evaluated in the manner described in Example X. The test results are shown in Table IV.

Table IV

| Sample No. | Vertical Flammability Test (3 Seconds Bone Dry) After Flame (sec.) | Char Length |
| --- | --- | --- |
| 1 | NAF[1] | 1.25" |
| 2 | NAF | 1.00" |
| 3 | 5.0 | 2.00" |
| 4 | 4.0 | 1.50" |

[1]NAF - No after flame

The results in Table IV show that the random copolyester yarn of ethylene terephthalate and 7.0 mole percent of ethylene-2,2',6,6'-tetrabromo diphenoxyethane-4,5'-dicarboxylate, when blended with a flame-retardant cellulosic, will pass stringent flammability standards.

EXAMPLE XII

Fibers of 2,6-Naphthalene Dicarboxylate Copolyester (5.8 percent Bromine)

A reaction vessel equipped with a nitrogen inlet, heating means and stirring means, was charged with 100 grams (0.148 mole) of diethyl-2,2',6,6'-tetrabromo diphenoxyethane-4,4'-dicarboxylate, 19.32 g. (0.312 mole) of ethylene glycol and 0.05 g. of tetrabutyl titanate (0.05 weight percent). The mixture was heated to 185°C. in about 45 minutes, at which time the first drop of distillate was collected. After an additional 37.3 minutes, the reaction temperature had reached 196°C., at which time 50 percent of the theoretical ethyl alcohol had been collected. Heating was continued at 196°-210°C. for 90 minutes, followed by a final period of 45 minutes at 210°-230°C. After cooling, the reaction equipment was dismantled, giving 104.8 g. of white prepolymer.

In a manner similar to that described above, 732 grams (3.0 moles) of dimethyl-2,6-naphthalene dicarboxylate, 390 grams (6.3 moles) of ethylene glycol and 0.69 gram of tetrabutyl titanate were charged into a reaction vessel. The mixture was heated to 175°C. in about 45 minutes, at which time the first drop of distillate was collected. After an additional 60 minutes, the temperature of the mixture had reached 193°C. at which time 50 percent of the theoretical methanol had been distilled. Heating was continued at 193°-218°C. for about 2 hours, followed by a final period of 40 minutes at 218°-230°C. After cooling, the reaction equipment was dismantled, giving 918.8 g. of white prepolymer.

137.7 grams (0.045 mole) of the prepolymer of bis(-2-hydroxyethyl)-2,6-naphthalene dicarboxylate as prepared above was combined in a reaction vessel with 15.6 grams (0.022 mole) of the prepolymer of bis(2-hydroxyethyl)-2,2',6,6'-tetrabromo diphenoxyethane-4,4'-dicarboxylate as prepared above. The mixture was initially heated at 220°-245°C. for 25 minutes, then raised to 275°C. over a period of 45 minutes where it remained for the duration of the reaction. Concurrently, the pressure within the reactor was reduced in a stepwise fashion from atmospheric pressure to 10 mm. in 50 minutes, thence to 2 mm. in 15 minutes and further to 0.6 mm. in another 15 minutes. After 50 minutes at 0.6-0.12 mm. Hg., the polycondensation was finished. The resultant resin was spun into a 241 denier, 10 filament yarn through a spinneret affixed to the bottom of the reactor.

83.6 grams of white yarn were obtained. The yarn resin had an intrinsic viscosity of 0.42; a free carboxyl content of 15 meq./kg.; a glass transition temperature of 113°C., a crystalline melting point of 243°C., and 5.82 percent bromine.

The extruded filaments were drawn to 4.73 times their original length on a heated godet and a hot platen at 300°F.

After drawing, the copolyester yarn was combined in a conventional manner with the flame-retardant rayon described in Example XI to provide a 50/50 blend. This yarn was knit on a Lawson knitting machine into a fabric weighing 6.41 ounces per square yard. The fabric blend was evaluated in the same manner as described in Example X. The test results are shown in the following table:

Table V

| Sample No. | Vertical Flammability Test (3 Seconds Bone Dry) After Flame (sec.) | Char Length |
| --- | --- | --- |
| 1 | NAF[1] | 3.31" |
| 2 | 1.5 | 3.58" av. |
| 3 | " | " |
| 4 | " | " |
| 5 | " | " |

[1]NAF - No after flame

These results show that the blended fabric passed the vertical flame test as specified by the United States Department of Commerce FF-3-71.

These results are further unexpected in light of the data shown in Example X. While an exact explanation for the above is not available, and without wishing to be bound by theory, it may be postulated that the striking results obtained from the brominated copolyester of ethylene-2,6-naphthalene dicarboxylate can be attributed to some type of synergism functioning between the bromine atoms and the naphthalene nucleus of the polyester, or the combination products thereof.

EXAMPLE XIII

Fibers of 2,6-Naphthalene Dicarboxylate Copolyester (9.8 percent Bromine)

A polymerization vessel was charged with 124 grams (0.405 mole) of the prepolymer of bis(2-hydroxyethyl)-2,6-naphthalene dicarboxylate as prepared in Example XII and 27.5 grams (0.039 mole) of the prepolymer bis(2-hydroxyethyl)-2,2',6,6'-tetrabromo diphenoxyethane-4,4'-dicarboxylate as prepared in Example XII. The stirred mixture was heated from 220°-240°C. in 25 minutes, while reducing the pressure to 50 mm., then heated from 240°-275°C. for 30 minutes, while the pressure was further reduced to 0.6 mm. Hg. After 50 minutes at 0.6-0.13 mm., the polycondensation was finished. The resultant resin was spun into a 261 denier, 10 filament yarn through a spinneret affixed to the bottom of the reactor.

The yarn was white and weighed 73.0 grams. The yarn resin had an intrinsic viscosity of 0.41; a free carboxyl content of 13 meq./kg., a glass transition temperature of 106°C. and a crystalline melting point of 261°C. The yarn was found to contain 9.78 percent bromine.

This copolyester yarn was drawn 5.78 times over an input godet and platen both heated to 300°F.

After drawing, it was combined in a conventional manner with the flame-retardant rayon described in Example X to provide a 50/50 blend. This yarn was knit on a Lawson knitter and weighed 6.84 oz. per square yard. The fabric blend was evaluated in the vertical flame tester in the same manner as described in Example X. The test results are shown in the following table:

Table VI

| Sample No. | Vertical Flammability Test (3 Seconds Bone Dry) After Flame (sec.) | Char Length |
|---|---|---|
| 1 | NAF[1] | 2.91″ avg. |
| 2 | ″ | ″ |
| 3 | ″ | ″ |
| 4 | ″ | ″ |
| 5 | ″ | ″ |

[1]NAF - No after flame

The results shown in Table VI are an improvement over those reported in Table V; char lengths were shorter and no "after flame" was observed in the latter set of samples.

Table VII summarizes the tensile properties of the yarns prepared in Examples X–XIII. The yarns were processed in each case to obtain the best physical properties.

Table VII

| Example | Bromine, % | Tenacity, g./d. | Elongation, % | Initial Modulus, g./d. |
|---|---|---|---|---|
| PET[1] | 0 | 3.4 | 39.2 | — |
| PEN-26[2] | 0 | 5.1 | 34.8 | — |
| X | 4.35 | 4.22 | 42.3 | 88.6 |
| XI | 10.0 | 3.92 | 36.3 | 93.9 |
| XII | 5.82 | 4.22 | 39.0 | 86.9 |
| XIII | 9.78 | 4.05 | 30.7 | 86.4 |

[1]Processed fibers of homopolymer of ethylene terephthalate.
[2]Processed fibers of homopolymer of ethylene-2,6-naphthalene dicarboxylate.

The data in Table VII indicate that polyester yarn obtained from the copolymerization of dialkyl-2,2',6,6'-tetrabromo diphenoxyethane-4,4'-dicarboxylate with either dimethyl terephthalate or dimethyl naphthalene-2,6-dicarboxylate and ethylene glycol, possess physical properties that are considered satisfactory to those skilled in the art.

EXAMPLE XIV

The ultra-violet light stability of fibers of a random copolyester of 91.3 mole percent of ethylene-2,6-naphthalene dicarboxylate units and 8.7 mole percent of ethylene-2,2',6,6'-tetrabromo diphenoxyethane-4,4'-dicarboxylate units (10 percent bromine) processed into yarn (Sample A) in a manner similar to that described in Example XIII was evaluated in an Atlas Weather-O-Meter, equipped with a Xenon lamp, according to the procedure outlined in AATCC Test Method 16E-1964. These fibers were compared with a control sample of fibers of a processed yarn of the homopolymer of poly(ethylene-2,6-naphthalene dicarboxylate) and several other copolyesters of ethylene-2,6-naphthalene dicarboxylate.

The results are set forth in the following table:

Table VIII

| Sample | Hours of Exposure | | | | | |
|---|---|---|---|---|---|---|
| | 0 | 20 | 40 | 60 | 80 | 100 |
| Control | 3.0 | 3.0 | 2.5 | 2.0 | 1.5 | 1.0 |
| A | 5.0 | 5.0 | 5.0 | 5.0 | 4.5 | 4.0 |
| B | 3.0 | 3.0 | 2.5 | 2.0 | 1.0 | 1.0 |
| C | 3.0 | 3.0 | 2.5 | 2.0 | 1.5 | 1.0 |

Sample A is the processed yarn of this invention as described above (10 percent bromine by weight). Sample B is a processed yarn prepared from a copolyester of ethylene-2,6-naphthalene dicarboxylate units and ethylene-2,5-dibromoterephthalate units providing a polymer containing 5 percent bromine by weight. Sample C is a processed yarn from a copolyester prepared by polycondensing a prepolymer of bis(hydroxyethyl)-2,6-naphthalene dicarboxylate with 2,2-bis[4-($\beta$-hydroxyethoxy)-3,5-dibromophenyl] propane to provide a polymer containing 10 percent bromine by weight.

The rating scale used in the above table is based on a "grayness scale", wherein 5.0 is considered the maximum value assigned to a white article. Thus, values less than 5.0 are indicative of color formation. Values of 4.5–5.0 would be considered acceptable for standard textile articles, whereas values less than this would be termed unacceptable. It can be seen from the above data that articles containing the subject of this invention exhibit unexpectedly improved resistance to ultra-violet irradiation.

In addition to the above ultra-violet light study, the ultra-violet stability of polyethylene terephthalate resin fibers was compared with that of fibers prepared from various brominated copolyesters of ethylene terephthalate resins and fibers prepared from the homopolymer resin of polyethylene terephthalate and brominated additives. In the following table, Sample D is processed fibers of ethylene terephthalate homopolymer resin; Sample E is processed fibers of a copolyester of ethylene terephthalate units and ethylene-2,2'-6,6'-tetrabromo diphenoxyethane-4,4'-dicarboxylate units (10 weight percent bromine), a representative fiber of this invention; Sample F is processed fibers of a copolyester of ethylene terephthalate units and ethylene-2,5-dibromoterephthalate units (9.48 weight percent bromine); Sample G is processed fibers of a copolyester of ethylene terephthalate units and units having the following formula:

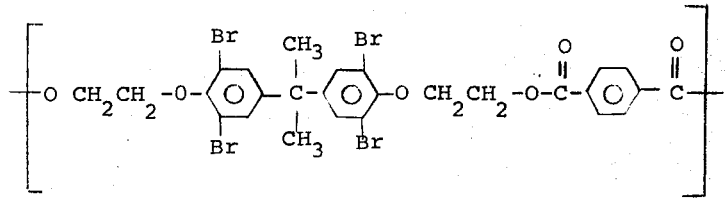

The resulting fibers contained 9.98 weight percent bromine. Samples H and I are processed fibers of a homopolymer of ethylene terephthalate resin having dispersed therein decabromodiphenyl ether, Sample H contains 10 weight percent bromine and Sample I contains 5.64 weight percent bromine.

Table IX

| Sample | Hours of Exposure | | | |
|---|---|---|---|---|
| | 0 | 20 | 40 | 80 |
| D | 5.0 | 5.0 | 5.0 | 5.0 |
| E | 5.0 | 4.5 | 4.0 | 3.0 |
| F | 5.0 | 4.0 | 3.5 | 2.5 |
| G | 5.0 | 5.0 | 4.5 | 3.5 |
| H | 5.0 | 3.5 | 2.5 | 1.0 |
| I | 5.0 | 3.5 | 2.5 | 1.0 |

The foregoing table demonstrates that with terephthalic acid copolymers of this invention, the resin is not severely degraded by exposure to ultra-violet light. The terephthalate copolyester resin of this invention (Sample E) demonstrates better ultra-violet light stability than a terephthalate copolyester resin containing ethylene-2,5-dibromoterephthalate (Sample F) and terephthalate homopolymers containing brominated additives (Samples H and I) and almost as good ultra-violet light stability as a terephthalate copolyester containing the comonomer currently used in commercially available flame-retardant polyester fibers (Sample G).

Various changes and modifications may be made in practicing the invention without departing from the spirit and scope thereof and, therefore, the invention is not to be limited except as defined in the appended claims.

We claim:

1. A filament-forming, copolyester resin of from at least 3 up to 15 mol percent of random ester units having the following general formula

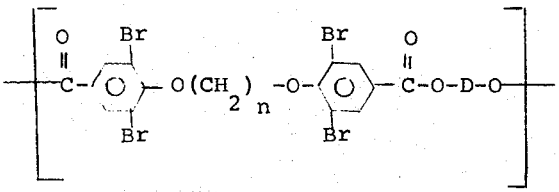

wherein $n$ is 2, 4 or 6 and D is the residue of a saturated diol, and from 97 to 85 mol percent of at least one different ester unit of a saturated organic dicarboxylic acid and a saturated diol, at least a major proportion of said organic dicarboxylic acid being an aromatic dicarboxylic acid.

2. The copolyester resin of claim 1 wherein —D— is the residue of an aliphatic glycol having the formula HO—$(CH_2)_a$—OH wherein $a$ is an integer of from 2 to 10.

3. The copolyester of claim 2 wherein the aliphatic glycol is ethylene glycol.

4. The copolyester resin of claim 1 wherein said aromatic dicarboxylic acid is terephthalic acid or 2,6-naphthalene dicarboxylic acid.

5. The copolyester resin of claim 1 wherein saturated organic dicarboxylic acid is all terephthalic acid or 2,6-naphthalene dicarboxylic acid.

6. The copolyester resin of claim 1 in the form of a shaped article.

* * * * *

UNITED STATES PATENT OFFICE
CERTIFICATE OF CORRECTION

PATENT NO. : 3,873,504
DATED : March 25, 1975
INVENTOR(S) : Richard R. Boettcher and William N. Knopka It is certified that error appears in the above-identified patent and that said Letters Patent are hereby corrected as shown below:

Col. 9 (Example VIII), line 63, "diethyl-2,2',6,'-" should read --diethyl-2,2',6,6'- --.

Signed and sealed this 27th day of May 1975.

(SEAL)
Attest:

RUTH C. MASON
Attesting Officer

C. MARSHALL DANN
Commissioner of Patents
and Trademarks